United States Patent [19]

Jacobson

[11] 4,389,545
[45] Jun. 21, 1983

[54] REMOTE REWIND MECHANISM AND CONTROL CIRCUITRY FOR A TAPE CASSETTE TELEPHONE ANSWERING DEVICE

[76] Inventor: Sava Jacobson, 8130 Orion St., Van Nuys, Calif. 91406

[21] Appl. No.: 220,359

[22] Filed: Dec. 29, 1980

[51] Int. Cl.³ .................................................. H04M 1/64
[52] U.S. Cl. .................................. 179/6.07; 360/96.3; 360/74.1
[58] Field of Search ...................... 179/6.07; 360/96.3, 360/96.4, 105, 74.1; 242/200, 201

[56] References Cited

U.S. PATENT DOCUMENTS

| | | | |
|---|---|---|---|
| 3,751,042 | 8/1973 | Platt | 360/96.3 |
| 3,821,800 | 6/1974 | Maltese | 360/96.4 |
| 3,904,826 | 9/1975 | Murata | 179/6.11 |
| 4,104,487 | 8/1978 | Jacobson | 360/71 |
| 4,126,763 | 11/1978 | Jacobson | 179/6.11 |
| 4,149,202 | 4/1979 | Terada | 360/96.3 |
| 4,197,426 | 4/1980 | Jacobson | 179/6.11 |
| 4,201,888 | 5/1980 | Jacobson | 179/6.07 |
| 4,213,010 | 7/1980 | Jacobson | 179/6.11 |
| 4,236,044 | 11/1980 | Jacobson | 179/6.11 |

Primary Examiner—Alan Faber
Attorney, Agent, or Firm—Spensley, Horn, Jubas & Lubitz

[57] ABSTRACT

In this magnetic tape cassette telephone answering device, remote controlled playout of previously recorded messages is facilitated by using a movable carriage to support the record/playback head and the pinch roller for the incoming message cassette. This carriage is normally spring biased into operative contact with the cassette tape. A mode selection knob includes a sector-shaped cam which engages a pin on the carriage so as to retract the carriage away from cassette engagement when the "rewind" condition is manually selected. In the automatic "answer" mode, the cam is disengaged from the pin so that the carriage is maintained in contact with the tape by operation of the bias spring. When message playback is remotely conditioned, a cam drive motor rotates an eccentric cam that is coupled to the carriage by a lost motion linkage. Cam rotation forces the carriage away from contact with the cassette tape, overcoming the spring bias of the carriage.

Retraction of the carriage also transfers spindle drive from the takeup reel spindle to the supply reel spindle, so that rewind is conditioned when the carriage is retracted either by manual "rewind" selection or by operation of the eccentric cam during the remote playout operation. The lost motion linkage arrangement permits manual movement of the carriage when the eccentric cam is in its rest position.

6 Claims, 7 Drawing Figures

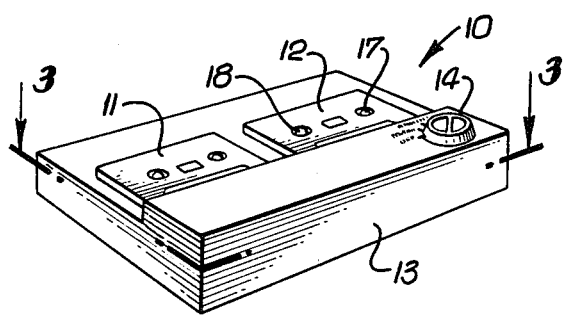
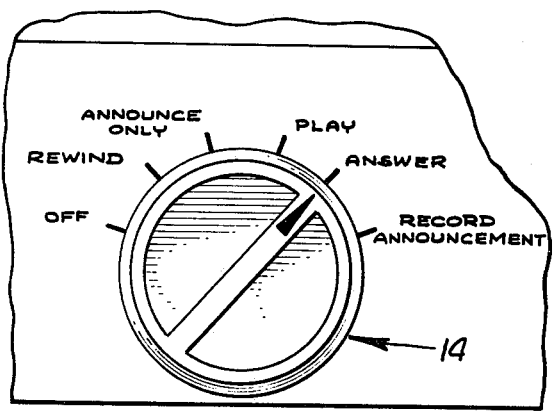
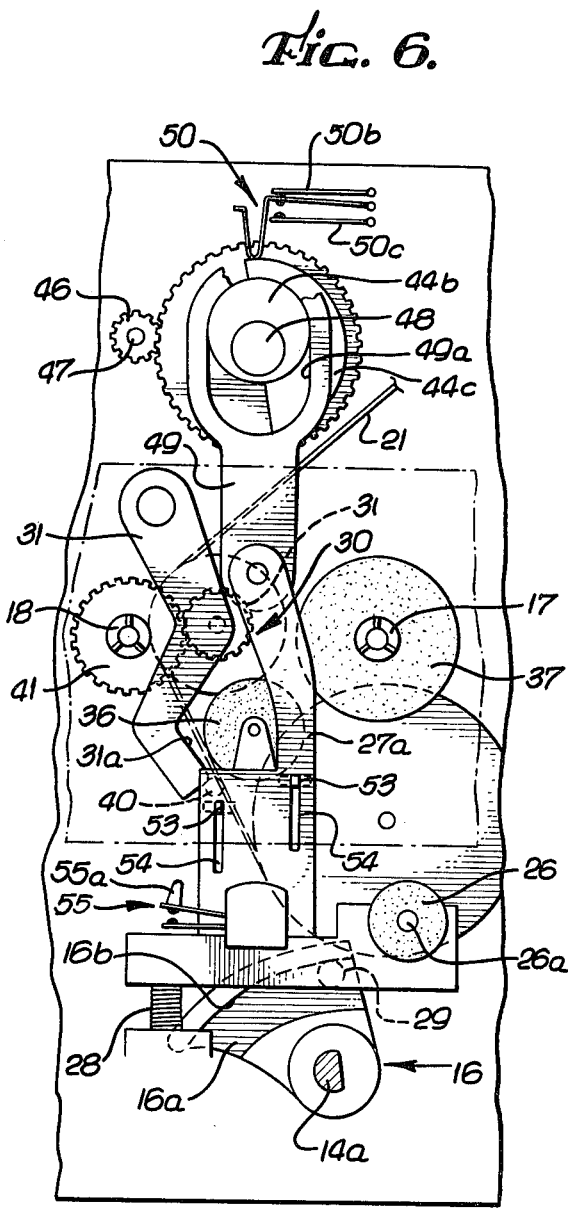
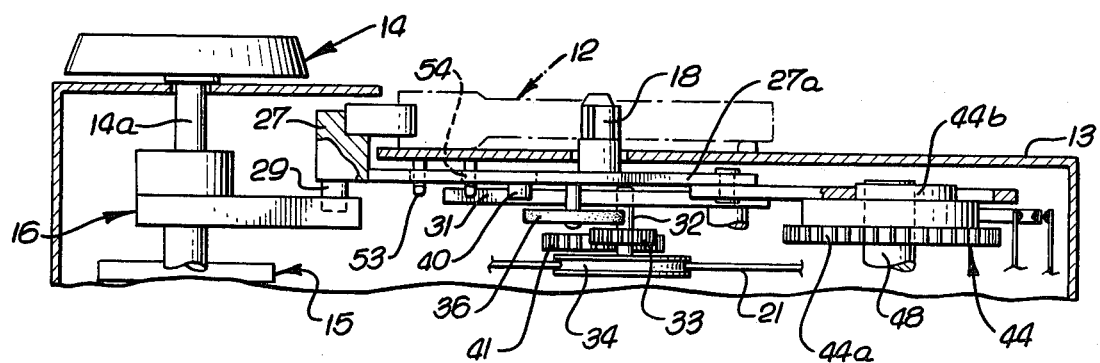

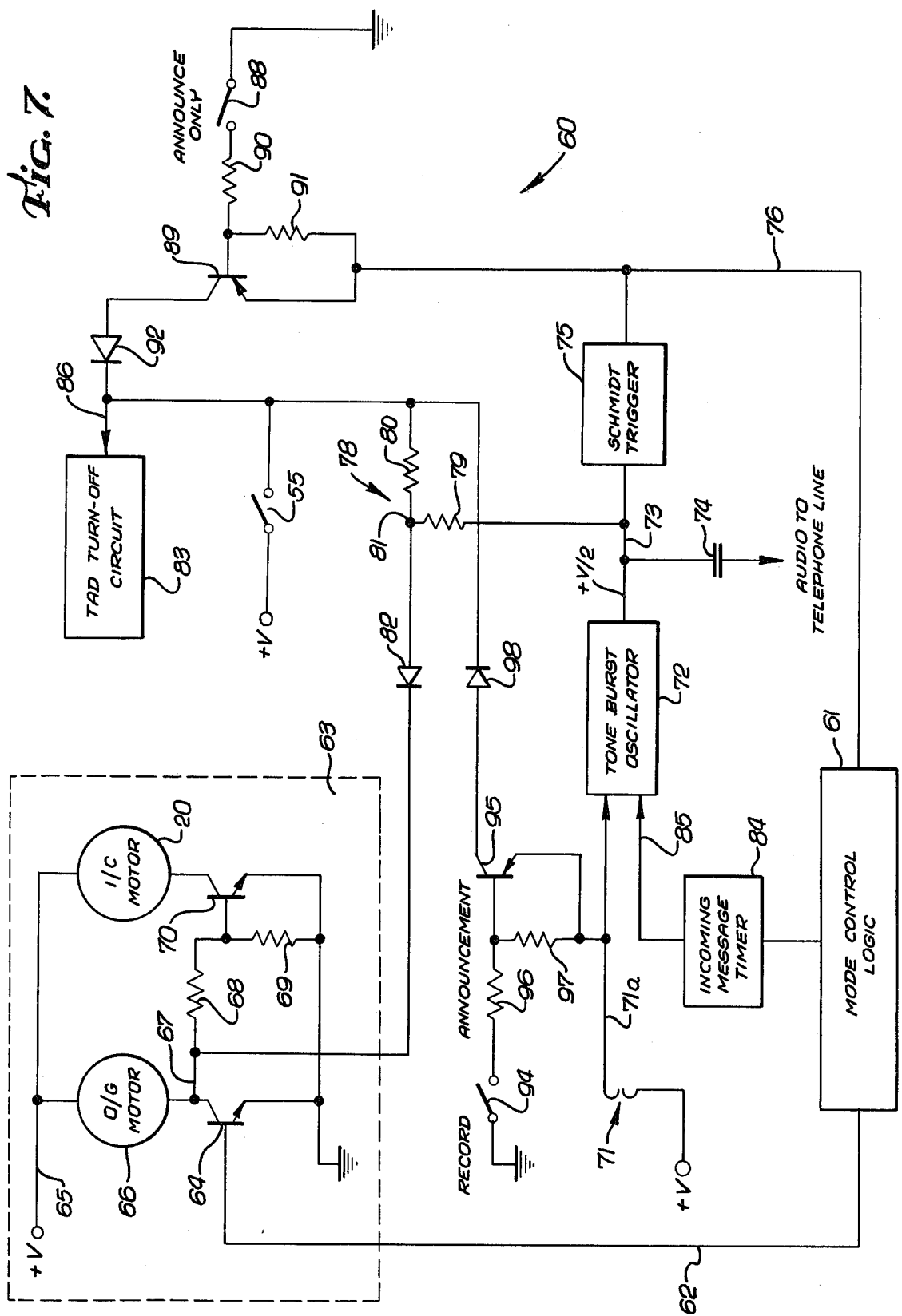

REMOTE REWIND MECHANISM AND CONTROL CIRCUITRY FOR A TAPE CASSETTE TELEPHONE ANSWERING DEVICE

BACKGROUND OF THE INVENTION

1. Field of the Invention

The present invention relates to a rewind mechanism for a magnetic tape cassette telephone answering device having a remote playback capability, and to control circuitry useful with such a device. Principles of the invention are set forth in the inventor's Disclosure Document No. 086,397 filed Dec. 7, 1979.

2. Description of the Prior Art

A desirable feature of a telephone answering device is to enable the user to play back previously recorded incoming messages under remote control. Such a facility allows the user, when he is away from his home or office, to call his own telephone number, and when the call has been automatically answered, to transmit a beep tone via the telephone line. Receipt of this beep tone causes the answering device automatically to rewind the incoming message tape, and then to drive the tape forward while picking up and transmitting to the telephone line the earlier recorded messages. The user can thus obtain his messages without first returning to the location of the telephone answering device.

Exemplary mechanisms for implementing such remote controlled playout in a reel-to-reel telephone answering device are set forth in the inventor's U.S. Pat. Nos. 4,104,487; 4,197,426; 4,201,888; 4,213,010; and 4,236,044. In these patents, circuitry and mechanisms are described for detecting the beep tone, and in response thereto, for conditioning the device first to rewind the incoming message tape and then to drive the tape forward while the messages are played out. Systems are also disclosed therein for terminating the remote playout and for reconditioning the device to answer additional calls.

All of the above mentioned patented systems utilize a reel-to-reel tape for recording the incoming messages. The use of a magnetic tape cassette has certain advantages over such a reel-to-reel arrangement. For the same length of tape, a cassette requires less space, thereby enabling size reduction of the device without reducing the number of incoming messages that can be recorded. With a cassette, there is no problem of tape accidently spilling off the reel. Cassettes are easy to handle and replace. If the user should wish to retain the recorded incoming messages, this can be done by simply substituting a new cassette. The outgoing announcement advantageously may be recorded on a re-entrant tape loop cassette.

Prior art remote playout mechanisms are not directly usable in a cassette telephone answering device because of certain constraints imposed by the cassettes themselves. Particularly notable is that the tape is exposed through an open edge of the cassette package. This necessitates the use of a record/playback head and a pinch roller that can be inserted through the open cassette edge into engagement with the tape. In the automatic answering mode of a telephone answering device, the head and pinch roller will normally be operatively positioned in engagement with the tape. Thus when the user signals for remote playout, the record head and pinch roller must be withdrawn from the cassette prior to rewinding the tape. When rewind is complete, the head and pinch roller must be reinserted against the tape to facilitate message pickup and remote playback.

Thus, a rewind mechanism for a tape cassette telephone answering device having remote playout capability must include means for automatically withdrawing the head and pinch roller prior to rewind, and for reestablishing physical contact of the head and pinch roller with the tape when rewind is complete. An object of the present invention is to provide such means.

In a normal cassette mechanism, the record/playback head is mounted on a carriage which is pushed forward into the tape cassette by a cam mechanism which is operated by a pushbutton or rotary knob. The pinch roller normally is spring loaded on a separate bracket so as to bias the tape against the drive capstan with a certain force which is independent of that exerted on the carriage by the cam mechanism. Such an arrangement presents a problem when remote recovery is desired, since it would then be necessary to use the same cam mechanism to withdraw the carriage from the cassette. Another object of the present invention is to overcome this shortcoming by providing a head and pinch roller carriage assembly which differs from the prior art in that the inventive carriage is normally spring biased into contact with the cassette tape, and is retracted away from the cassette alternatively by a manual cam mechanism or by a remotely controlled lost motion linkage. Concomitantly, a further objective of the present invention is to provide a remote controlled rewind mechanism for a tape cassette telephone answering device.

It is also an objective of the present invention to provide certain simplified electrical control circuitry for a telephone answering device. The circuitry facilitates return of the answering device to the standby or off condition from various different modes of operation including the normal answering mode, an "announcement only" answering mode, and a "record announcement" mode.

SUMMARY OF THE INVENTION

These and other objectives are achieved in a tape cassette telephone answering device having a remote controlled message playback capability. The record/playback head and the pinch roller for the incoming message tape cassette are mounted on a carriage which itself is movable toward and away from the cassette. The carriage is spring biased into the operative position in which the head engages the tape and the pinch roller presses the tape into driven engagement with the capstan.

For manual operation, a sector-shaped cam is rotated by the mode selection knob of the answering device. When this knob is set to the "play", "answer" or "record announcement" position, the cam is disengaged from a cam follower pin on the carriage. As a result, the spring biases the carriage into operative contact with the cassette. When the knob is rotated toward the "rewind" position, the cam engages the pin and pulls the carriage away from the cassette, disengaging the head and pinch roller. At the same time, a drive transfer assembly is pivoted from a forward position in which the rotation of a tape drive motor is communicated to the cassette takeup reel spindle to a rewind position in which the rotational motion is communicated to the supply reel spindle. Thus manual transfer from the forward to the rewind position is accomplished by cam actuated withdrawal of the carriage.

To facilitate remote controlled rewind, a lost motion linkage is connected to the carriage that supports the head and pinch roller. Situated in an opening in the link arm is an eccentric cam mounted to a circular gear. This gear is rotated by a cam drive motor. Normally the eccentric cam and gear are situated so that the lost motion of the linkage permits the head and pinch roller carriage to be moved freely between the tape-engaging and retracted positions.

When a remote playout beep tone is detected, the cam drive motor is energized so as to rotate the gear and eccentric cam through approximately 180°. As this occurs, the eccentric cam forces the link arm in the appropriate direction so as to drive the carriage away from the tape cassette, against the force of the bias spring. Since such remote playout only takes place when the device is set to the "answer mode", the manual sector-shaped cam is out of contact with the cam follower pin, and hence these components do not interfere with retraction of the carriage by the remote control cam mechanism.

When the carriage has thus been retracted, the cam drive motor is turned off. This leaves the eccentric cam so positioned as to maintain the carriage in its retracted state. The tape is then rewound. When rewind is complete, the cam drive motor once more is energized. Now the gear and eccentric cam rotate an additional 180° back to the original position. Since the eccentric cam is no longer forceably retracting the carriage, the bias spring urges the carriage back toward the tape cassette. The head and pinch roller reengage the tape in condition for pickup and remote playout of the previously recorded messages.

The circuitry disclosed herein utilizes a tone burst oscillator which is actuated at the end of outgoing announcement transmission and at the end of the incoming message recording period. The oscillator produces a short burst of audio tone superimposed on a DC bias. The audio tone itself is capacitively coupled to the telephone line, either directly or through an amplifier, and so provides an indication to the caller that he should now begin his message or that the time for recording his message is now over.

The DC output component of this oscillator is used to control both the mode control logic of the answering device and the turn-off circuit which returns the device to the standby mode. A steering circuit is employed by means of which the first tone burst does not cause device to turn off, but only causes the mode control logic to accomplish the mid-cycle transfer from outgoing message transmission to recording of the incoming message. The steering circuit then causes the next tone burst to actuate the turn-off circuit so as to end the answering cycle and return the device to the standby mode.

Two other switch circuits are associated with the tone burst oscillator. In the "announcement only" mode, the first tone burst from the oscillator is supplied directly to the turn-off circuit. Therefore the device shuts down immediately after outgoing message and first audio tone transmission. In the "record announcement" mode, the trigger signal that is used to actuate the tone burst oscillator is shunted directly to the turn-off circuit. This causes the device to turn off immediately after the new announcement is recorded without generation of any tone burst.

BRIEF DESCRIPTION OF THE DRAWINGS

A detailed description of the invention will be made with reference to the accompanying drawings wherein like numerals designate corresponding elements in the several figures.

FIG. 1 is a pictorial view of the inventive remote playout telephone answering device utilizing magnetic tape cassettes.

FIG. 2 is a fragmentary top view of the answering device of FIG. 1 showing the mode selection knob thereof.

FIG. 4 is a transverse sectional view of the mechanism of FIG. 3 as seen along the line 4—4 thereof.

FIG. 6 is a view like that of FIGS. 3 and 5, but with the carriage retracted manually by means of the sector-shaped cam associated with the mode selection knob.

FIG. 7 is an electrical schematic diagram of the inventive control circuitry.

DESCRIPTION OF THE PREFERRED EMBODIMENTS

Figure 3:
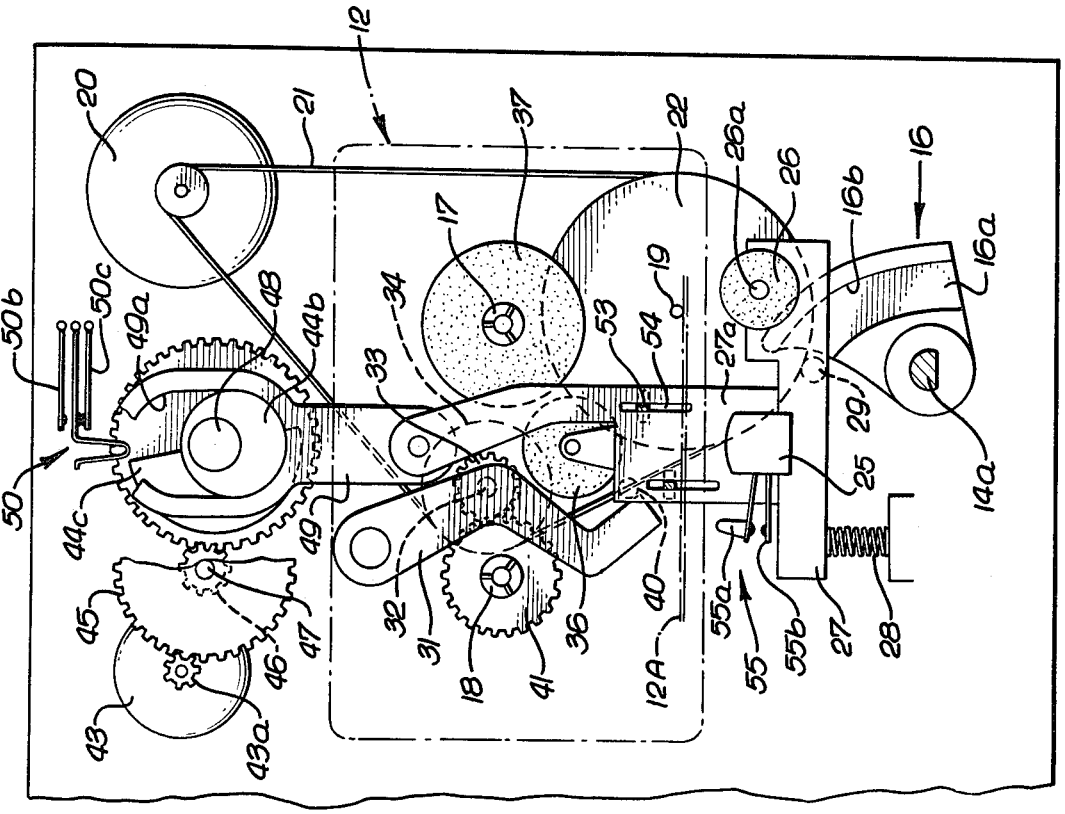
FIG. 3 is a partial transverse sectional view of the answering device of FIG. 1 as seen along the line 3—3 thereof, showing the rewind mechanism in the "answer" position in which the carriage is situated with the record/playback head and pinch roller in engagement with the cassette tape.

The following detailed description is of the best presently contemplated modes of carrying out the invention. This description is not to be taken in a limiting sense, but is made merely for the purpose of illustrating the general principles of the invention since the scope of the invention best is defined by the appended claims. Operational characteristics attributed to forms of the invention first described also shall be attributed to forms later described, unless such characteristics obviously are inapplicable or unless specific exception is made.

The inventive telephone answering device 10 (FIGS. 1 and 2) advantageously employs a reentrant loop magnetic tape cassette 11 that contains the outgoing announcement, and a separate magnetic tape cassette 12 onto which incoming messages are recorded. The cassettes 11 and 12 are removably situated on a housing or chassis 13 which contains the operating mechanisms and circuitry of the device 10. A knob 14 is used for mode selection, and thus may be rotated to any of the positions designated in FIG. 2. An electrical rotary selection switch 15 (FIG. 4) is operated by the shaft 14a of the knob 14 and serves to engage the electrical circuitry (known per se) needed to implement each operational mode. The shaft 14a also engages a sector-shaped cam 16 (FIGS. 3 through 6) which cooperates in making the requisite mechanical configurations for each mode.

The incoming message tape cassette 12 engages a conventional takeup reel spindle 17, supply reel spindle 18 and drive capstan 19. The capstan 19 is driven by a cassette drive motor 20, which is fixedly mounted to the chassis 13, via a belt 21 and a drive wheel 22.

A record/playback head 25 and a pinch roller 26 both are mounted to a carriage 27 which itself is movably mounted to the chassis 13. A spring 28 biases the carriage 27 into the cassette-engaging position showin in FIGS. 3 and 4. Here the head 25 operatively contacts the cassette tape 12A and the pinch roller 26 presses the tape 12A against the drive capstan 19. The pinch roller 26 rotates about a shaft 26a that is directly mounted to the carriage 27. No separate bracket is required, since the force of the spring 28 adequately, continuously biases the entire pinch roller 26 and carriage assembly against the tape 12A.

When the mode selection knob is in the "answer" position shown in FIGS. 2 through 5, the sector-shaped cam 16 is out of contact with a pin 29 that projects downwardly from the carriage 27. This disengagement permits the spring 28 freely to bias the carriage 27 into contact with the cassette 12.

Rotational motion is imparted to the takeup reel spindle 17 via a transfer assembly 30 carried by an arm 31 that is pivotally mounted to the chassis 13. The assembly 30 includes a shaft 32 which depends from the arm 31. Mounted on the shaft 32 are a gear 33 and a pulley 34 which engages the belt 21. Projecting from the carriage 27 is an elongate member 27a which itself carries an idler wheel 36. The member 27a may be an integral part of the carriage 27. When the carriage 27 is biased into contact with the cassette 12 (FIGS. 3 and 4), the idler wheel 36 operatively engages the shaft 32 and the rim of a conventional slip clutch 37 associated with the takeup reel spindle 17. Accordingly, rotation of the motor 20 is communicated to the spindle 17 via the pulley 34, the shaft 32, the idler wheel 36 and the clutch 37. In this way, the spindle 17 is appropriately driven so as to wind the tape 12A onto the takeup reel as it is driven from the capstan 19.

Manually selected rewind of the tape cassette 12 is accomplished by rotating the knob 14 to the "rewind" position. This causes the sector-shaped cam 16 to rotate from the "answer" position of FIG. 3 to the "rewind" position of FIG. 6. During such rotation, the pin 29 enters an arcuate channel or recess 16a in the cam 16, and engages the shoulder 16b thereof. This shoulder 16b serves as the camming surface of the cam 16 while the pin 29 functions as the cam follower. The channel 16a and shoulder 16b are appropriately curved so that as the knob 15 is rotated counterclockwise (as viewed in FIGS. 2, 3 and 6), the pin 29 and hence the carriage 27 are withdrawn away from the cassette 12, overcoming the bias force of the spring 28. This withdraws the head 25 and the pinch roller 26 out of contact from the tape 12A.

During such retraction, a pin 40 which depends from the member 27a rides against a surface 31a of the arm 31 and thereby causes the arm 31 to pivot clockwise from the position shown in FIG. 3 to that shown in FIG. 6. Such pivoting causes the gear 33 to mesh with a gear 41 on the shaft of the supply reel spindle 18. Accordingly, rotation of the motor 20 is communicated via the belt 21, the pulley 34, the shaft 32 and the gears 33 and 41 to the supply reel spindle 18. In this manner, rewinding of the tape 12A is enabled. Retraction of the carriage 27 and pivoting of the arm 31 also cause the idler wheel 36 to disengage from the shaft 32 and from the clutch 37. This insures that the takeup reel spindle 18 is not directly driven during rewind.

Figure 5:
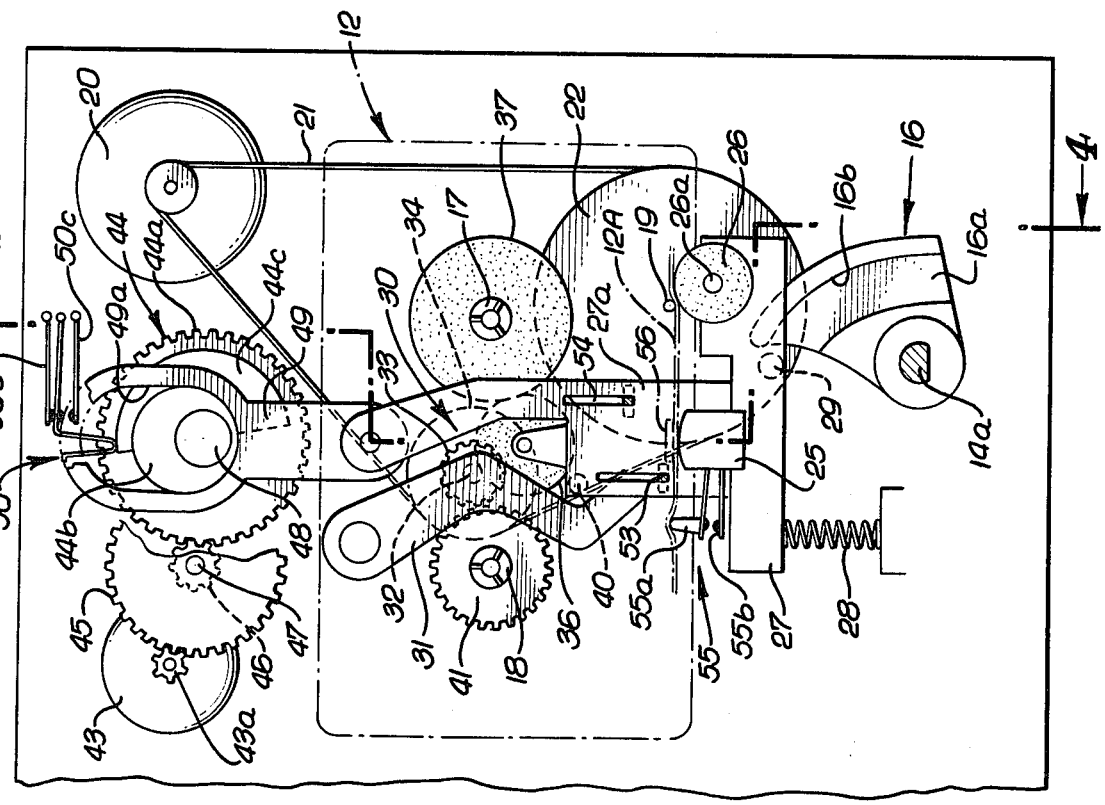
FIG. 5 is a transverse sectional view like that of FIG. 3, but with the head and pinch roller carriage retracted from the tape cassette by operation of the remote controlled rewind mechanism.

Remote controlled playout can be conditioned when the mode selection knob 14 is in the "answer" position. In a manner known per se, when a remote control "beep" tone is received by the device 13 during an answering cycle, power will be supplied to a cam drive motor 43 which drives a cam member 44 (FIG. 3, 5 and 6). The drive train consists of a gear 43a on the motor 43, a set of gears 45, 46 on a shaft 47, and the peripheral gear teeth 44a of the cam member 44. The motor 43, the shaft 47 and a shaft 48 about which the cam member 44 rotates all are mounted to the chassis 13.

The cam member 44 includes a circular cam 44b that is eccentrically offset with respect to the shaft 48. In the standby condition (i.e., when remote rewind is not conditioned), the cam 44b is oriented as shown in FIG. 3. The cam 44b seats within an elongate opening 49a of a lost motion link arm 49 that is pivotally coupled to the elongate member 27a. The opening 49a is sufficiently long so as to permit the carriage 27, the member 27a and the arm 49 to be moved freely between the "answer" position of FIG. 3 and the manually selected "rewind" position of FIG. 6. That is, the "lost motion" of the arm 49 accommodates the manual selection of the "answer" or "rewind" mode.

When remote playout is conditioned (with the knob 14 in the "answer" position), energization of the motor 43 drives the cam member 44 counterclockwise from the position shown in FIG. 3 through 180° to the position shown in FIG. 5. During such rotation, the eccentric cam 44b first pivots the arm 49 with respect to the member 27a and then drives both the arm 49, the member 27a and the carriage 27 toward the retracted or "rewind" position shown in FIG. 5. When this has been accomplished, and the cam member 44 has been rotated through 180°, the motor 43 is deenergized. The carriage 27 and drive transfer assembly 30 then both are situated in the "rewind" configuration (FIG. 5). The cassette tape 12A now is rewound automatically. During rotation of the cam member 44 to the orientation of FIG. 5, the carriage 27 was free to move since the sector-shaped cam 16 was positioned out of the way of the pin 29.

The angular orientation of the cam member 44 is sensed by a feeler switch 50 that cooperates with a cam surface 44c on the cam member 44. In the standby or "answer" orientation of FIG. 3, this cam surface 44c pushes the arm 50a of the switch 50 against a first contact 50b. When the motor 43 has rotated the cam member 44 counterclockwise to the "rewind" position of FIG. 5, the arm 50a falls off of the end of the cam surface 44c and makes electrical contact with a switch member 50c. Such contact is recognized by an appropriate electrical circuit, known per se, and used to deenergize the motor 43 while actual rewinding of the tape 12A takes place.

When rewind is complete, an appropriate end-of-rewind sensor (known per se) causes the motor 43 again to be energized. As a result, the cam member 44 is rotated counterclockwise through an additional 180° back to the original, tape engaging position of FIG. 3. There, the switch arm 50a again makes contact with the switch member 50b, thereby deenergizing the motor 43 and leaving the system in the orientation shown in FIG. 3 in which the tape 12A is driven in the forward direction by the capstan 19 and pinch roller 26 while the previously recorded messages are picked up by the head 25 for remote playout to the user. During rotation of the cam member 44 from the position shown in FIG. 5 to that shown in FIG. 3, the eccentrically projecting portion of the cam 44b moves away from the carriage 27. That is, the cam 44b is rotated to a position where it no longer urges the arm 44, the member 27a and the carriage 27 away from the cassette 12. Thus, the spring 28 is once again able to bias the carriage 27 into head and pinch-roller engaging contact with the tape 12A.

The control circuitry for responding to a remote playout control signal or "beep" tone, and for operating the cam drive motor 43 is known per se. Illustrative circuits are shown in the inventor's U.S. Pat. Nos. 4,104,487; 4,126,763; 4,197,426; 4,201,888 and 4,213,010.

The carriage 27 and elongate member 27a may be movably supported from the chassis 13 in any conventional manner. For example, they may be supported by a pair of inverted-T shaped supports 53 (FIG. 4) which extend downwardly from the chassis 13 through a pair of slots 54 (FIGS. 3-6) in the member 27a.

The carriage 27 may also carry a fail-safe switch 55 which causes the device 10 to shut down when all of the incoming message tape is used up. As shown in FIG. 3, the tape feeler arm 55a of the switch 55 normally displaces the tape 12A a slight amount, so that the switch 55 remains open. However, when all of the incoming message 12A has been wound onto the takeup reel, the tension on the tape 12A increases sufficiently so as to force the arm 55a toward the carriage 27 and into electrical contact with the switch member 55b. Such switch closure then actuates an appropriate electrical circuit, known per se and typified by the turn-off circuit 83 of FIG. 7, which deactivates the answering device 10 so that it will answer no additional calls. Alternatively, the switch 55 may be used in conjunction with fail-safe circuitry of the type generally shown in the inventor's U.S. Pat. No. 4,213,010 which will permit the user to obtain remote access to the device 10, even though the fail-safe switch 55 is closed. The user can then accomplish remote controlled rewind of the tape cassette 12, and thereby recondition the device 10 to answer additional incoming calls. Although the switch 55 normally slightly depresses the tape 12A, adequate contact between the tape 12A and the record/playback head 25 is maintained by normal spring loaded pressure pad 56 which is part of the conventional cassette 12.

Illustrative control circuitry 60 for the answering device 10 is shown in FIG. 7. In the automatic "answer" mode, conventional mode control logic circuitry 61 conditions the device 10 to respond to a ring signal and to initiate transmission of the outgoing announcement from the tape loop cassette 11. To this end, when a ring signal is detected the logic 61 provides a signal on the line 62 to a motor drive circuit 63. This signal turns on a transistor 64 thereby connecting power from a +V voltage supply line 65 to a motor 66 which drives the tape loop cassette 11. Since the transistor 64 is on, its collector node 67 is at ground potential so that no voltage is supplied via a pair of resistors 68, 69 to the base of a transistor 70. The transistor 70 thus stays off, so that no voltage is supplied to the motor 20 which drives the incoming message tape cassette 12.

At the end of outgoing announcement transmission, when the loop in the cassette 11 has made a complete revolution, a conductive strip on the tape loop shorts a pair of contacts 71. As a result, a positive voltage is supplied via line 71a to the input of a tone burst oscillator 72. This causes the tone burst oscillator 72 to produce on a line 73, for a short duration of time, an audio tone superimposed on a DC bias voltage. Typically, this DC bias is +V/2, that is, one-half of the voltage from the source 65. In such case, the audio tone excursions will alternate above and below this +V/2 DC bias level. The audio component is coupled to the telephone line via a capacitor 74. It is this transmitted audio tone burst which informs the caller that the outgoing announcement has been completed and that the caller should now begin speaking his message, which will be recorded on the incoming message cassette 12.

The DC component of the oscillator 72 output is used to cause the mode control logic 61 to shift operation to the incoming message record mode. The DC component on the line 73 actuates a Schmidt trigger 75 which in turn produces on a line 76 a control signal that causes the mode control logic 61 to implement the "mid-cycle shift". The logic circuitry 61 terminates the signal on the line 62 so that the motor control circuit 63 will turn off the motor 66 which drives the announcement tape cassette 11, and will turn on the motor 20 which drives the message cassette 12. In addition, the logic circuitry 61 will condition other circuitry (not shown) to amplify the incoming message for recording onto the tape 12A.

Associated with the output line 73 from the oscillator 72 is a steering circuit 78. This insures that the first tone burst from the oscillator 72 will in fact be directed to the Schmidt trigger 75 and the mode control logic 61. The circuit 78 includes a pair of resistors 79, 80 the junction 81 of which is connected via a diode 82 to the node 67 in the motor control circuit 63. During outgoing announcement transmission, the node 67 is at ground potential, so that the node 81 is likewise effectively grounded. As a result, the first tone burst from the oscillator 72 is not coupled via the resistor 80 to a turn-off circuit 83 for the device 10. The first tone burst is only directed to the Schmidt trigger 75 and hence to the mode control logic 61 so as to cause the desired mid-cycle shift to the incoming message record mode.

In this record mode, the line 62 is low so that the transistor 64 is off and no current is provided to the motor 66. As a result, the node 67 rises to the approximatly +V voltage level of the supply line 65. This voltage appears across the resistors 68 and 69, thereby turning on the transistor 70 and providing power to the motor 20 which drives the incoming message cassette 12.

The time duration for recording an incoming message is established by a timer 84 which is turned on by the logic 61 at the mid-cycle shift. At the end of a preset time duration, the timer 84 provides a signal via a line 85 which again causes the oscillator 72 to produce a tone burst of short duration. This second audio tone tells the caller that the answering cycle has ended and that no more incoming speech will be recorded. Now the steering circuit 78 directs the DC component of the oscillator 72 output to the turn-off circuit 83 which terminates the answering cycle and returns the device 10 to the standby mode in readiness to answer the next call.

The steering circuit 78 acts in this manner since the diode 82 is connected to the node 67 which is at a +V voltage level during recording of the incoming message. Thus, when the second tone burst occurs, the diode 82 effectively appears to be an open circuit with respect to the +V/2 DC component of the oscillator output 72. Thus this DC component is fed via the resistors 79 and 80 to the input terminal 86 of the turn-off circuit 83. Although the signal also is supplied to the Schmidt trigger 75 and the mode control logic 61, these circuits have no effect since the turn-off circuit 83 predominates in turning off the device 10. Of course, the mid-cycle shift action of the Schmidt trigger 75 and mode control logic 61, and operation of the turn-off circuit 83 advantageously are delayed by a sufficient time to permit transmission of the audio component of the respective first and second tone bursts.

If the "announce only" mode is selected using the knob 14 (FIGS. 1 and 2), a switch 88 (FIG. 7) is closed. This has the effect of connecting the output from the Schmidt trigger 75 directly to the input 86 of the turn-off circuit 83. Thus, immediately after transmission of the outgoing announcement, the first output of the tone burst oscillator 72, which is conditioned by closure of the contacts 71, is used to actuate the turn-off circuit 83. As a result, the answering device shuts down and does not go into the incoming message record mode. In other words, the device 10 operates as desired only to transmit the announcement.

When the switch 88 is closed, the base of an NPN transistor 89 is connected to ground via a resistor 90. The output line 76 from the Schmidt trigger 75 is connected directly to the emitter of the transistor 89 and via a resistor 91 to the base of this transistor. Accordingly, the positive voltage pulse output of the Schmidt trigger 75 is conducted by the transistor 89, which is now on, and by a diode 92 to the input 86 of the turn-off circuit 83. Thus, the first output of the tone burst oscillator 72 actuates the turn-off circuit 83 via the Schmidt trigger 75 and transistor 89. This occurs even though the DC component of this first tone burst from the oscillator 72 is prevented from directly reaching the turn-off circuit 83 by the steering circuit 78, the node 81 of which is then effectively grounded.

If a new announcement is being recorded, there is no need whatever to transmit an audio tone to the telephone line. Moreover, it is desirable to turn off the device 10 as soon as the tape loop in the cassette 11 has completed a single revolution, corresponding to the maximum time duration for the outgoing announcement. These operations are facilitated when the mode selector knob 14 (FIGS. 1 and 2) is set to the "record announcement" mode, thereby closing a switch 94.

Closure of the switch 94 causes an input pulse to be supplied directly to the turn-off circuit 83 when the contacts 71 are bridged by the conductive strip on the tape loop in the cassette 12. To this end, closure of the switch 94 connects the base of a transistor 95 to ground via a resistor 96. When the contacts 71 are closed, a positive voltage is supplied via the line 71a directly to the emitter of the transistor 95 and via a resistor 97 to the base of this transistor. As a result, a corresponding positive pulse is supplied via the transistor 95 and a diode 98 to the input terminal 86 of the turn-off circuit 83. This immediately causes shutdown of the device 10. No tone burst is generated by the oscillator 72, and the device 10 is turned off as soon as the tape loop has completed the single revolution during which the new announcement was recorded.

I claim:

1. A telephone answering device in which incoming messages from a telephone line are recorded on a cassette tape, and in which previously recorded incoming messages can be played back under remote control upon receipt of a remote control signal from said telephone line, the improvement comprising:

a carriage movable between a cassette tape engaging position and a disengaged, rewind position, said carriage carrying the playback head and pinch roller for said tape, said carriage being biased into the tape engaging position, drive transfer means, linked to the movement of said carriage, for transferring motor imparted tape driving force from the cassette takeup reel spindle to the supply reel spindle when said carriage is moved to said disengaged, rewind position, and cam motor driven lost motion linkage means including a lost motion linkage coupled to said carriage, and a motor driven cam operatively engaging said lost motion linkage and positionable between first and second cam orientations, the lost motion of said linkage permitting unimpeded manual retraction of said carriage when said cam is in said first orientation, receipt of said remote control playback signal causing said cam to be motor driven to said second orientation in which said lost motion linkage urges said carriage against the bias thereof into said disengaged, rewind position.

2. A telephone answering device according to claim 1 including a manual carriage retraction means comprising:

a cam-follower pin on said carriage, a generally sector-shaped, manually rotatable cam, said pin being disengaged from said cam when said cam is rotated to a first "answer" position, thereby permitting said carriage to be biased into said cassette tape engaging position or to be urged into said disengaged, rewind position by said lost motion linkage means, said manually rotatable cam being rotatable to a second "rewind" position, during which rotation said cam engages said pin and by cam follower action moves said carriage against the bias thereof from said tape engaging position to said disengaged, rewind position.

3. A telephone answering device in which incoming messages from a telephone line are recorded on a magnetic tape cassette, the improvement comprising:

a carriage carrying a record/playback head and a pinch roller for said incoming message tape cassette, spring bias means for biasing said carriage into a tape-engaging position, manual retraction means for selectively retracting said carriage against the bias of said bias means into a rewind position in which said head and said pinch roller are disengaged, and drive transfer means, linked to the movement of said carriage, for transfering motor-imparted tape driving force from the cassette takeup reel spindle to the cassette supply reel spindle when said carriage is retracted to said rewind position, and further comprising:

cam motor driven lost motion linkage means for facilitating remote controlled rewind of said incoming message tape cassette comprising:

a lost motion linkage coupled to said carriage, and a motor driven cam operatively engaging said lost motion linkage and positionable between first and second cam orientations, the lost motion of said linkage permitting unimpeded manual retraction of said carriage when said cam is in said first orientation, motor driven positioning of said cam to said second orientation causing said linkage to move said carriage away from said tape engaging position into said rewind position, said motor driven cam being operative in response to receipt of a remote playback control signal from said telephone line.

4. A telephone answering device of the type in which incoming messages from a telephone line are recorded on a magnetic tape cassette, said device having a chassis, a tape drive motor for said cassette mounted to said chassis, tape takeup and supply reel spindles and a drive capstan for said tape, a control mechanism which facilitates the playback of previously recorded incoming messages under remote control, upon receipt of a remote control signal from said telephone line, said control mechanism comprising:

- a carriage movably mounted to the chassis of said telephone answering device for generally linear movement toward or away from the open, tape exposed side of said incoming message tape cassette,
- a record/playback head and a pinch roller both mounted on said carriage for engagement with the tape of said cassette once said carriage is moved into a tape engaging position, said pinch roller urging said tape into operative driven engagement with said drive capstan,
- spring bias means for biasing said carriage into a tape engaging position,
- manual cam means for selectively urging said carriage away from said tape engaging position,
- a drive transfer means, coupled to said carriage, for communicating rotation of said tape drive motor to said takeup reel spindle when said carriage is in said tape engaging position, and to said supply reel spindle when said carriage is in a retracted, rewind position disengaged from said tape, and
- motor driven cam means, operative upon actuation of remote playback upon receipt of said remote control signal, for driving said carriage away from said tape engaging position, into said rewind position, against the force of said spring bias means, and wherein said motor driven cam means comprises:
- a cam drive motor mounted to said chassis and operated in response to receipt of said remote control signal,
- a cam following lever arm connected to said carriage, and
- a cam operatively driven by said cam motor and operatively engaging said arm, said arm permitting lost motion so that when said cam is in a rest position, said carriage and said arm are free to move between said tape engaging and said rewind positions,
- rotation of said cam by said cam drive motor urging said arm and said carriage into said rewind position.

5. A telephone answering device according to claim 4 wherein said manual cam means includes:
- a cam follower on said carriage, and
- a manually operated cam configured to engage said cam follower only when in certain positions, said cam being disengaged from said cam follower when in an automatic answering position, said motor driven cam means then being able to drive said carriage into said rewind position without interference by said manual cam,
- said manually operated cam engaging said cam follower to move said carriage away from said tape engaging position when rotated to a "rewind" position.

6. A telephone answering device according to claim 4 wherein said drive transfer means comprises:
- an arm pivotably mounted to said chassis,
- a rotatable shaft mounted to said arm,
- a gear and a pulley carried by said shaft, and a belt operatively connecting said pulley to said drive motor,
- arm engaging means on said carriage for pivoting said arm into a position in which said gear engages a gear on said takeup reel spindle when said carriage is retracted to said rewind position, and
- an idler wheel mounted to said carriage, said idler wheel operatively connecting said shaft and a clutch on said takeup reel spindle when said carriage is in said tape engaging position, the bias force of said belt or a separate bias spring normally urging said arm into a forward drive position in which rotation of said tape drive motor is communicated to said takeup reel spindle via said pulley, said shaft, said idler wheel and said takeup reel spindle clutch.

* * * * *